United States Patent [19]

Fisher

[11] Patent Number: 4,869,614

[45] Date of Patent: Sep. 26, 1989

[54] CLAMPING CONNECTOR

[75] Inventor: William F. Fisher, Peterborough, Canada

[73] Assignee: Fisher Gauge Limited, Peterborough, Canada

[21] Appl. No.: 187,711

[22] Filed: Apr. 29, 1988

[51] Int. Cl.⁴ .............................................. F16B 12/00
[52] U.S. Cl. ......................................... 403/8; 403/20; 403/231
[58] Field of Search ............... 403/405.1, 406.1, 407.1, 403/8, 245, 264, 403, 231, 20

[56] References Cited

U.S. PATENT DOCUMENTS

| 3,264,019 | 8/1966 | Houvener et al. | 403/8 |
| 3,410,584 | 11/1968 | Bus . | |
| 3,694,821 | 10/1972 | Moritz . | |
| 4,120,598 | 10/1978 | Zernig et al. . | |
| 4,202,645 | 5/1980 | Giovannetti . | |
| 4,300,850 | 11/1981 | de la Haye et al. . | |
| 4,416,561 | 11/1983 | Fischer | 403/8 |
| 4,518,278 | 5/1985 | Koch . | |

FOREIGN PATENT DOCUMENTS

| 2546749 | 4/1977 | Fed. Rep. of Germany . | |
| 2643354 | 3/1978 | Fed. Rep. of Germany . | |
| 3036560 | 5/1982 | Fed. Rep. of Germany ... | 403/405.1 |
| 1467282 | 1/1967 | France . | |

Primary Examiner—Randolph A. Reese
Assistant Examiner—Carol I. Bordan
Attorney, Agent, or Firm—Smart & Biggar

[57] ABSTRACT

To join a part having a threaded shaft protruding therefrom with a second part having a bore sized to receive the shaft and an intersecting cavity, a housing is provided which rotatably receives a nut. The nut has a circumferentially extending external gear surface and the housing has two nut actuator receptors communicating with its interior at this gear surface of the nut. The housing with nut is received within the cavity of the second part and the shaft of the first part is inserted into the bore in the second part till the shaft abuts the nut. A nut actuator inserted into one of the nut actuator receptors may then be rotated to thread the shaft into the nut and draw the two parts into abutment.

9 Claims, 3 Drawing Sheets

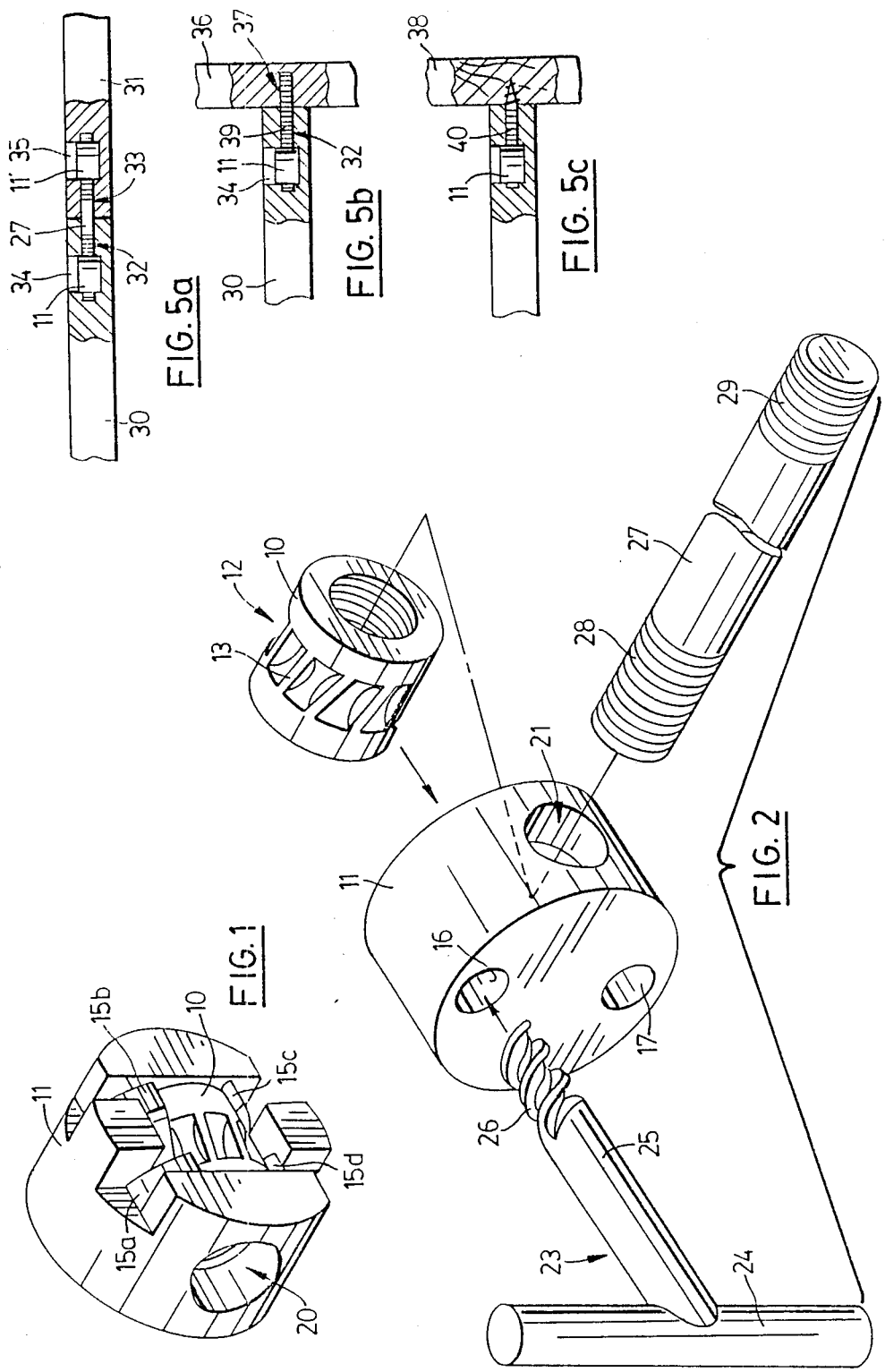

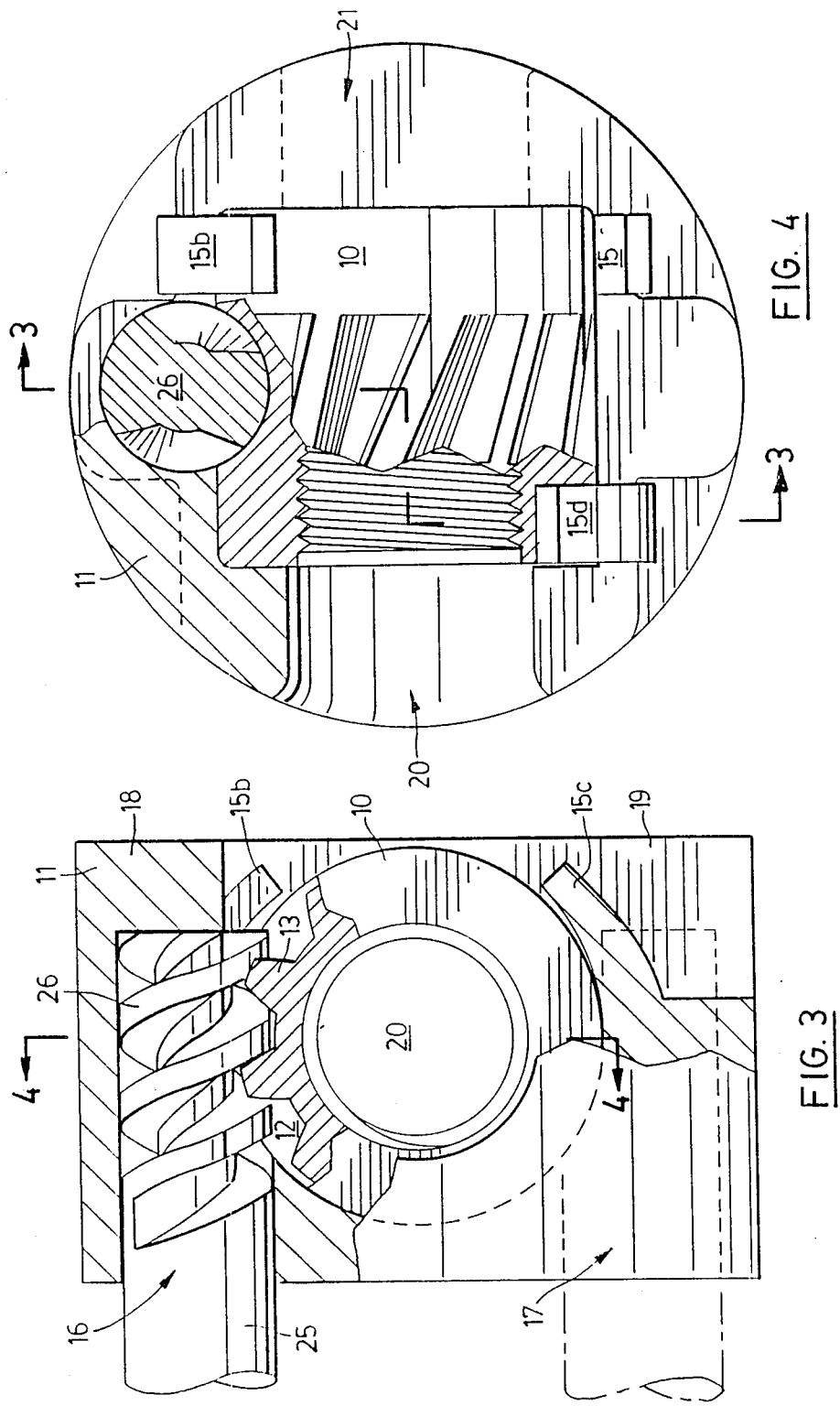

U.S. Patent   Sep. 26, 1989   Sheet 3 of 3   4,869,614
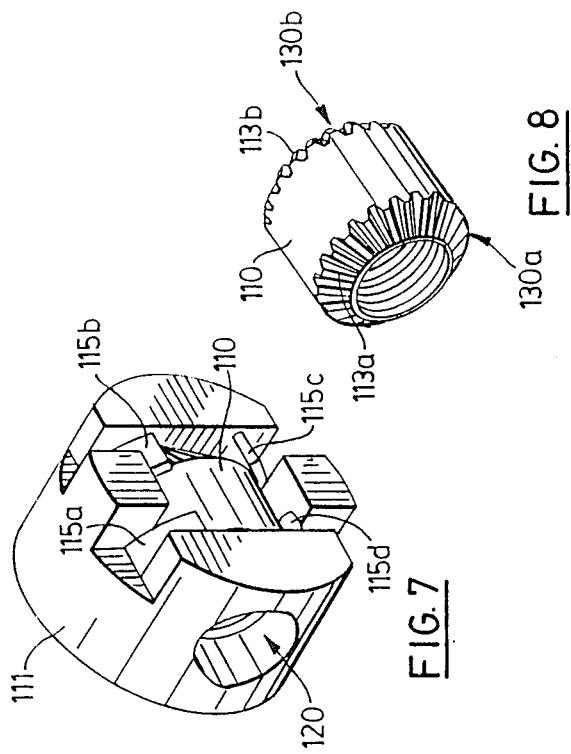
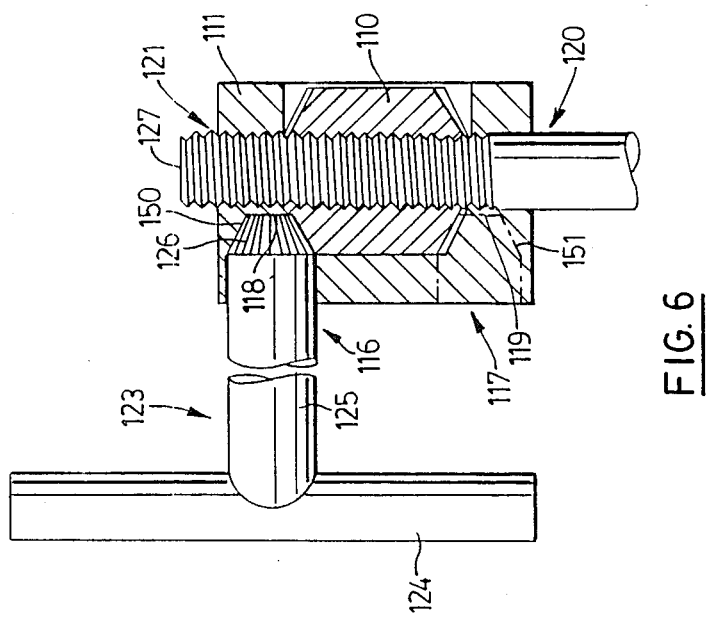

CLAMPING CONNECTOR

BACKGROUND OF THE INVENTION

This invention relates to a device to join two parts, such as parts of furniture.

In the past a number of cam operated joints have been proposed to permit assembly of structures. For example, in the U.S. Pat. No. 4,120,598 to Zernig issued Oct. 17, 1978 the head of an arm hinged to one part is slid through a slot in a second part into a cam containing cavity. By rotation of the cam, the head of the arm is first engaged by a cam surface and then drawn by the cam surface into the second part. In this way the parts may be joined and pulled into abutment at the joint. A cam is, however, limited in the distance it will draw in an arm. Further, a cam may loosen over time if the parts are subject to any vibration and thus the joint may eventually come apart. Finally, in situations where the joint need be made and separated repeatedly over time, the cam may wear and fail to function properly. Thus, there remains a need for a joint for joining two parts and pulling same into abutment at the joint which avoid drawbacks present in prior known joints.

SUMMARY OF THE INVENTION

Accordingly there is provided apparatus to join a part of the type having a threaded shaft protruding therefrom with a second part of the type having a bore therein and a cavity intersecting said bore, said apparatus comprising: a nut having external circumferential gear surface means; a housing for reception in a cavity of a part of the type having a bore therein and a cavity intersecting said bore, said housing rotatably receiving said nut and having two nut actuator tool bores each of said two nut actuator tool bores terminating in an abutment and communicating at its side with the interior of said housing with said circumferential gear surface of said nut protruding into said side, said two nut actuator tool bores communicating with the interior of said housing at diametrically opposite sides of said nut and sized to permit insertion of a nut actuator tool for rotating said nut, whereby said nut actuator tool may be inserted in one of said two nut actuator tool bores for rotating said nut in one direction and may be inserted in the other of said two nut actuator tool bores for rotating said nut in the opposite direction, said housing having openings to permit a threaded shaft protruding from a part to be threaded through said nut.

In another aspect there is provided apparatus to join a first part of the type having a threaded shaft protruding therefrom with a second part of the type having a bore therein and a cavity intersecting said bore, said apparatus comprising: a nut having external circumferential gear surface means; a housing for reception in a cavity of a part of the type having a bore therein and a cavity intersecting said bore with the bottom of said housing supported by the bottom of said cavity, said housing rotatably receiving said nut, said housing having at least one nut actuator tool bore in the top of said housing terminating in an abutment and communicating at its side with the interior of said housing with said circumferential gear surface means of said nut protruding into said side, said at least one nut actuator tool bored size to permit insertion of a nut actuator tool for rotating said nut, said housing having openings coaxial with said nut and sized to permit a threaded shaft protruding from a part to be threaded through said nut, said openings located so that the distance between the bottom of said housing and said openings is substantially the same as the distance between the bottom of said cavity and said bore.

DESCRIPTION OF THE DRAWINGS

In the Figures which represent example embodiments of the invention:

FIG. 1 is a perspective view of the nut and housing of one embodiment of this invention, FIG. 2 is an exploded view of the nut and housing of FIG. 1 together with a nut actuator and a shaft, FIG. 3 is a side sectional view of this invention along the lines 3—3 of FIG. 4, FIG. 4 is an end sectional view of this invention along the lines 4—4 of FIG. 3, FIGS. 5a through 5c illustrate various methods of employing this invention to join two parts, FIG. 6 is a top sectional view of another embodiment of this invention, FIG. 7 is a perspective view of the embodiment of of FIG. 6, FIG. 8 is a perspective view of the nut of the embodiment of FIG. 6.

DESCRIPTION OF THE PREFERRED EMBODIMENTS

Turning now to FIGS. 1 through 4, the joint of this embodiment comprises a nut 10 with an external medial circumferential gear surface 12. The teeth 13 of the gear surface 12 extend to the outside diameter of the end portions of the nut and make an oblique angle with the ends of the nut. Thus, the gear surface allows the nut to function as a worm wheel.

Nut 10 is rotatably received within housing 11 and is retained therein by tangs 15a, 15b, 15c, and 15d of the housing which are bent around the nut, as shown in FIG. 1. In FIG. 4, tang 15c is shown in its unbent position.

As seen in FIGS. 2 and 3, the top of housing 11 contains two bores 16 and 17 which act as nut actuator receptors. By reference to FIG. 3, it is seen that the side of each nut actuator receptor 16 and 17 communicates with the interior of the housing at the external teeth 13 of the nut 10 (when the nut is received with the housing with the external teeth 13 protruding into the side of bores 16 and 17). The nut actuator receptors 16 and 17 terminate in abutments 18 and 19, respectively. Openings 20 and 21 in each side of the housing 11 are coaxial with the nut 10 and expose the threaded bore of the nut.

A nut actuator (or nut actuator tool) 23 comprises handle 24 and shaft 25. The shaft 25 terminates in a worm screw 26. As best seen in FIG. 3, the nut actuator may be inserted into nut actuator receptor 16 and rotated clockwise threading the worm screw onto teeth 13 of the nut until the end of the nut actuator abuts abutment 18. Further clockwise rotation of the nut actuator will then cause the nut to rotate counterclockwise. Similarly, insertion of the nut actuator 23 into nut actuator receptor 17 and clockwise rotation of the nut actuator will result in clockwise rotation of nut 10. Thus, if end 28 of right hand threaded shaft 27 of FIG. 2 is threaded to nut 10 through opening 21 in the housing, clockwise rotation of the nut actuator 23 in nut actuator receptor 16 will draw the shaft 27 further through opening 21. Similarly, clockwise rotation of nut actuator 23 in nut actuator opening 17 will progressively expel shaft 27 through opening 21.

It is noted that shaft 27 is also threaded at its other end 29.

FIG. 5 illustrates the use of the invention in joining two parts. In FIG. 5a, each part 30 and 31, has a shaft receiving bore 32 and 33 and a cavity 34 and 35 intersecting the shaft receiving bore. A nut receiving housing 11 and 11' is received within the cavity of each part 30 and 31 with its nut actuator receptors (at 16 and 17 in FIG. 2) directed toward the cavity opening and the bottom of the housing supported by the bottom of the cavity. The distance between the bottom of the housing and the side openings (at 20 and 21 in FIG. 4) is substantially the same as the distance between the bottom of the cavity and the bore (32 or 33) so that the side openings 20 and 21 are in communication with the shaft receiving bore 32 or 33 when they are in line therewith. To join the two parts as shown in FIG. 5a, threaded shaft 27 is inserted into the shaft receiving bore 32 and 33 of each part and the parts are pushed together till the shaft 27 abuts the nut 10 in each of the housings 11 and 11'. A nut actuator (23 in FIG. 2) is then inserted into the appropriate nut actuator receptor (at 16 in FIG. 2) of each housing 11 and 11' and rotated clockwise to draw each end of shaft 27 into the nut of the housings 11 and 11'. Drawing the ends of shaft 27 into the nut of each housing 11 and 11' pulls the nuts toward each other which, in turn, as each housing is in a cavity in a part, pulls the parts together. Thus, by clockwise rotation of the nut in each housing 11 and 11', the two parts are joined and drawn into abutment.

By switching the nut actuator to the other nut actuator receptor (at 17 in FIG. 2) in one of both of the housings, the shaft may be expelled from one (or both) of the housings by clockwise rotation of the nut actuator in order to release the joint.

In FIG. 5b, a part 36 has a threaded shaft 39 threaded into a threaded bore, 37, therein. Part 30 is as in FIG. 5a so that the parts may be joined by inserting housing 11 into cavity 34, inserting threaded shaft 39 through the bore 32 in part 30 till the shaft abuts the nut in the housing, and rotating a nut actuator clockwise in the appropriate nut actuator receptor of housing 11 so that the shaft 39 is drawn into the housing.

FIG. 5c is similar to FIG. 5b save that shaft 39 is replaced with shaft 40 which terminates in a screw body at one end which is screwed into part 38. This modification is appropriate where part 38 is made of wood.

FIGS. 6 through 8 illustrate another embodiment of the subject invention wherein nut 10 of FIGS. 1 to 4 has been replaced by nut 110 and the housing 111 configured so as to be able to rotatably receive nut 110 with tangs 115a, 115b, 115c, and 115d retaining the nut 110 in the housing. Nut 110 has external canted teeth (113a and 113b) around its circumference at either end thereof. These teeth form bevel gears 130a and 130b at either end of the nut. With particular reference to FIG. 6, a nut actuator 123 is seen to comprise a handle 124, shaft 125, and toothed bevel gear end 126. Nut actuator receptors 116 and 117 in the back of housing 111 communicate with the interior of housing 111 at the bevel gear ends 130a and 130b of nut 110 and terminate in abutments 118 and 119 at the end of frustoconical surface segments 150 and 151. Therefore, by inserting the nut actuator 123 in either nut actuator receptor till the bevel gear end 126 of the nut actuator engages a bevel gear end 130a or 130b of the nut 110, the nut may be rotated by rotating the actuator. Consequently, a shaft 127 in nut 110 may be drawn into the nut or expelled therefrom, as desired, by rotation of the nut actuator 123 in the appropriate sense in either nut actuator receptor (116 or 117). Thus, this embodiment may also function in the manner described in connection with FIG. 5 to join two parts and bring same into abutment and, as well, to release two previously joined parts.

The embodiments of the invention in which an exclusive property or privilege is claimed are defined as follows:

1. Apparatus to join a part of the type having a threaded shaft protruding therefrom with a second part of the type having a bore therein and a cavity intersecting said bore, said apparatus comprising:
   (a) a nut having external circumferential gear surface means;
   (b) a housing for reception in a cavity of a part of the type having a bore therein and a cavity intersecting said bore, said housing rotatably receiving said nut and having two nut actuator tool bores each of said two nut actuator tool bores terminating in an abutment and communicating at its side with the interior of said housing with said circumferential gear surface of said nut protruding into said side, said two nut actuator tool bores communicating with the interior of said housing at diametrically opposite sides of said nut and sized to permit insertion of a nut actuator tool for rotating said nut, whereby said nut actuator tool may be inserted in one of said two nut actuator tool bores for rotating said nut in one direction and may be inserted in the other of said two nut actuator tool bores for rotating said nut in the opposite direction, said housing having openings to permit a threaded shaft protruding from a part to be threaded through said nut.

2. The joining apparatus of claim 1 further including:
   (c) a nut actuator tool for insertion in said two nut actuator tool bores for engaging said gear surface of said nut and for abutting said abutment in order to rotate said nut.

3. The joining apparatus of claim 1 wherein said housing includes tangs for retaining said nut in said housing.

4. The joining apparatus of claim 2 wherein said circumferential gear surface of said nut comprises teeth obliquely angled with respect to the ends of the nut to form a worm wheel.

5. Apparatus to join two parts, comprising:
   (a) a nut having circumferentially extending external teeth obliquely angled with respect to the ends of the nut to form a worm wheel;
   (b) a housing receiving said nut, said housing having two nut actuator tool bores, said housing for reception by a part to be joined;
   (c) a shaft threaded at either end for threading into a second part to be joined and for threading into said nut after reception of said housing by said part; and
   (d) a nut actuator tool for reception in one of said two nut actuator tool bores to engage said external teeth of said nut in order to rotate said nut in a first direction in order to thread said shaft into said nut and for reception in the other of said two nut actuator tool bores to engage said external teeth of said nut in order to rotate said nut in a second direction in order to expel said shaft from said nut.

6. Apparatus to join a first part of the type having a threaded shaft protruding therefrom with a second part of the type having a bore therein and a cavity intersecting said bore, said apparatus comprising:
  (a) a nut having external circumferential gear surface means;
  (b) a housing for reception in a cavity of a part of the type having a bore therein and a cavity intersecting said bore with the bottom of said housing supported by the bottom of said cavity, said housing rotatably receiving said nut and having two nut actuator tool bores each of said two nut actuator tool bores terminating in an abutment and communicating at its side with the interior of said housing with said circumferential gear surface means of said nut protruding into said side, said two nut actuator tool bores communicating with the interior of said housing at diametrically opposite sides of said nut and sized to permit insertion of a nut actuator tool for rotating said nut, whereby said nut actuator tool may be inserted in one of said two nut actuator tool bores for rotating said nut in one direction and may be inserted in the other of said two nut actuator tool bores for rotating said nut in the opposite direction, said housing having openings coaxial with said nut and sized to permit a threaded shaft protruding from a part to be threaded through said nut, said openings located so that the distance between the bottom of said housing and said openings is substantially the same as the distance between the bottom of said cavity and said bore.

7. The apparatus of claim 6 wherein said external circumferential gear surface means comprises a bevel gear surface at either end of said nut, each said bevel gear surface protruding into the side of one of said two nut actuator tool bores.

8. The joining apparatus of claim 7 wherein said housing includes tangs for retaining said nut in said housing.

9. The joining apparatus of claim 8 further including:
  (c) a nut actuator tool for insertion in said at least one nut actuator tool bore for engaging said gear surface of said nut and for abutting said abutment in order to rotate said nut.

* * * * *